United States Patent [19]

Chen

[11] Patent Number: 5,544,332
[45] Date of Patent: Aug. 6, 1996

[54] METHOD FOR PREVENTING DEADLOCK IN A MULTI-BUS COMPUTER SYSTEM

[75] Inventor: Sun-Den Chen, San Jose, Calif.

[73] Assignee: Sun Microsystems, Inc., Mountain View, Calif.

[21] Appl. No.: 402,727

[22] Filed: Mar. 13, 1995

Related U.S. Application Data

[63] Continuation of Ser. No. 766,835, Sep. 27, 1991, abandoned.

[51] Int. Cl.⁶ .................................................. G06F 13/36
[52] U.S. Cl. .................... 395/288; 395/280; 395/287; 395/290; 395/297; 395/728; 395/824; 395/869; 395/800; 364/132; 364/143; 364/DIG. 1
[58] Field of Search .............................. 395/800, 725, 395/325, 288, 280, 290, 287, 297, 824, 728, 869; 364/DIG. 1, 132, 143

[56] References Cited

U.S. PATENT DOCUMENTS

| | | | |
|---|---|---|---|
| 4,648,029 | 3/1987 | Cooper et al. | 395/325 |
| 4,868,741 | 9/1989 | Gula et al. | 395/293 |
| 4,987,529 | 1/1991 | Craft et al. | 395/325 |
| 5,038,276 | 8/1991 | Chen | 395/550 |
| 5,101,479 | 3/1992 | Baker et al. | 395/325 |
| 5,150,467 | 9/1992 | Hayes et al. | 395/325 |
| 5,182,808 | 1/1993 | Bagnoli et al. | 395/725 |
| 5,193,193 | 3/1993 | Iyer | 395/725 |

FOREIGN PATENT DOCUMENTS

| | | | |
|---|---|---|---|
| 0150767 | 1/1985 | European Pat. Off. | G06F 13/36 |
| 0181007 | 11/1985 | European Pat. Off. | G06F 13/38 |
| 0404413 | 6/1990 | European Pat. Off. | G06F 13/28 |

OTHER PUBLICATIONS

"Local Area Networks: Carrier Sense Multiple Access With Collision Detection (CSMA/CO) Access Method And Physical Layer Specification", IEEE, 1985.

*Primary Examiner*—Alyssa H. Bowler
*Assistant Examiner*—Dzung C. Nguyen
*Attorney, Agent, or Firm*—Blakely, Sokoloff, Taylor & Zafman

[57] ABSTRACT

Deadlock detection and masking systems are incorporated into a bus coupler intercoupling at least two buses, wherein at least one master is coupled to each bus and at least one slave is coupled to at least one of the buses. The bus coupler also includes an arbiter coupled to the buses to determine which master may control each bus. The deadlock detection system detects a potential arbitration deadlock condition between two master devices seeking control of a bus and access to a slave. Once a potential arbitration deadlock is detected, the masking system is activated to prohibit the second master from gaining control of the second bus for a random period of time. The random time delay acts as a mask to provide the first master device an opportunity to reaccess the slave device and avoid the deadlock situation. By providing a random masking period complementary, synchronized arbitration deadlocks are avoided.

19 Claims, 4 Drawing Sheets

METHOD FOR PREVENTING DEADLOCK IN A MULTI-BUS COMPUTER SYSTEM

This is a continuation of application Ser. No. 07/766,835 filed Sep. 27, 1991 now abandoned.

RELATED APPLICATIONS

The present invention is related to the following applications: U.S. Pat. No. 5,287,503, entitled "Methods and Apparatus For A Register Providing Atomic Access to Set and Clear Individual Bits of Shared Registers Without Software Interlock"; Ser. No. 07/766,834, entitled "Methods and Apparatus for Locking Arbitration on a Remote Bus"; Ser. No. 07/767,023, entitled "Methods and Apparatus For Dynamically Steering Undirected Interrupts"; and Ser. No. 07/766,784, entitled "A Bus-to-Bus Interface for Preventing Data Incoherence in a Multiple Processor Computer System".

BACKGROUND OF THE INVENTION

1. Field of the Invention

The system of the present invention is related to the field of bus arbitration within computer systems. Specifically, the system of the present invention relates to a bus arbitration architecture incorporating mechanisms to detect and resolve arbitration deadlock conditions created by substantially contemporaneous bus control requests issued by multiple masters.

2. Art Background

In a computer system, shared resources are commonly utilized to transfer data. One commonly used shared resource is a bus serving as a communication link between subsystems (e.g., processors) in a computer system. Generally, multiple devices may be coupled to the bus, wherein one device may transmit control signals or data to other devices coupled to the same bus. A common constraint in bus communications is that more than one device cannot transfer data on the same bus at the same time, because the data may be distorted. In order to maintain order of data transactions on the bus, one device is assigned to be a bus master which initiates read or write transaction to some other device which acts as a slave for that transaction. An arbitration scheme is utilized to determine which master gets control of the bus, determining the priority of the masters seeking control of the bus. There are generally two types of arbiters, serial and parallel. For specific information regarding bus arbiters, see, Stablings, *Computer Orgranization and Architecture* (1990), pp. 84-90.

More sophisticated computer systems may have multiple interconnected buses and multiple masters coupled to each bus. In a multiple bus multiple master computer system, a master may initiate a data transfer operation to a slave on a first bus, while another master may transfer data to a second slave on a second bus. A bus coupler is typically used to assist in routing data and control signals between the buses, and to determine which master should control which bus. Typically, a coupler includes at least one bus protocol unit, a data translation and buffering device, and at least one bus arbiter. The bus protocol is implemented through an interface which accommodated bus control signals. The data translation and buffering device assures that data are received and sent at the appropriate data rate, because the master may send data from one bus at one data rate and the slave on another bus may receive data at a different data rate. The bus arbiter allocates time for the master on the bus and grants control of the bus to one master at a time.

Referring to FIG. 1, a multiple bus system is illustrated. In FIG. 1, the multiple bus system includes two buses 51 and 57 interconnected via bus coupler 56. Masters 50 and 52 are connected to bus 51, and bus 57 interconnects master 58 and slaves 55 and 59. In the multiple bus system illustrated in FIG. 1, a "live" or continuing arbitration deadlock situation may arise when two masters coupled to two different buses attempt to access the same slave. That is, two masters seeking control of two different buses may create a continual, or "live", deadlock condition for the arbiters of the respective buses, wherein the masters requesting the bus connecting the target slave in a complementary synchronous fashion cause bus coupler 56 to deny access to the target slave by both masters. For example, master 50 coupled to bus 51 may gain control of bus 51 and bus 57 to access slave 59 to initiate a read or write transaction. While slave 59 performs the read or write transaction, slave 59 issues a "relinquish and retry" signal to master 50 if the transaction exceeds a predetermined amount of time. The "relinquish and retry" signal issued by slave 59 causes master 50 to temporarily disconnect from the access path, i.e., release control of bus 51 and bus 57, and retry access to slave 59 again later. Thus, both bus 51 and bus 57 are freed so that other devices can communicate over the bus while slave 59 completes the assigned transaction in the "background". For example, master 52 may access slave 55 while slave 59 is busy with the assigned transaction. Further, bus couple 56 designates master 50 to be the only device which may reselect slave 59. Therefore, no other master can access slave 59 prior to master 50 reaccessing slave 59. However, before master 50 has an opportunity to retry access to slave 59, master 58 gains control of bus 57 and attempts to initiate a transaction with slave 59. Because slave 59 is allocated to master 50, bus coupler 56 will deny access to master 58, bus coupler 56 permitting access only by master 50 to "clear" the pending relinquish and retry "condition" pursuant to the issued "relinquish and retry" signal When master 50 reinitiates the process to access the slave 59, the arbiter for bus 57 again denies master 50 control of bus 57 because bus 57 is currently engaged by master 58. Master 50 is instructed to "backoff" by the arbiter for bus 57, i.e., stop requesting control of bus 57, and subsequently retry to obtain control of bus 57. Furthermore, although the arbiter for bus 57 has allowed master 58 to control bus 57, master 58 will not be permitted to access slave 59 because master 50 was issued the "relinquish and retry" signal by slave 59. Recall that bus coupler 56 will only accept an access request from master 50 to clear the relinquish and retry signal issued by slave 59. Thus, master 58 will be instructed to "backoff" from slave 59, i.e., stop requesting access to slave 59, and wait until master 50 has accessed slave 59. Hence, the "live" deadlock situation arises when both masters 50 and 58 contemporaneously seek control of bus 57 and access to slave 59, wherein both masters 50 and 58 are told to backoff and try again at a later time.

As will be described in more detail below, the present invention permits potential arbitration deadlock conditions to be detected and subsequently resolved by providing a free-running timer to introduce a random time "offset" to bus requests issued by multiple masters. The random time offset permits bus requests made by one master to be masked, so that a second master may access the slave and clear the previous operation.

SUMMARY OF THE INVENTION

Methods and apparatus for detecting and resolving deadlock conditions in multiple bus, multiple master computer systems are disclosed. In the preferred embodiment of the present invention, a deadlock detection system and a masking system are provided in a bus coupler which couples at least two buses. At least one master is coupled to each bus and at least one slave is coupled to at least one of the buses. The bus coupler includes an arbiter coupled to each bus to determine which master may control the bus. The deadlock detection system detects a potential arbitration deadlock for control of a bus between two masters one of which has disconnected from the slave and bus pursuant to a relinquish and retry signal following acceptance of a task by the slave. Once the deadlock detection system detects a possible deadlock, the masking system included in the bus coupler prohibits a second master from gaining control of the second bus by masking the second masters bus request for a random period of time. The random time mask provides the first master an opportunity to control the bus and access the slave to clear the pending relinquish and retry condition. By providing a random masking period, the complimentary synchronized timing of a live deadlock situation between the first and second masters is eliminated. The random masking period is preferably based on the residue count of a counter provided in the masking system.

BRIEF DESCRIPTION OF THE DRAWINGS

The objects, features and advantages of the present invention will be apparent from the following description of the invention in which.

DETAILED DESCRIPTION OF THE INVENTION

The following describes the preferred embodiments of a bus arbitration architecture incorporating deadlock detection and masking with application to multiple bus computer systems. In the following description, for purposes of explanation, specific numbers, times, signals, architectures, etc. are set forth in order to provide a thorough understanding of the invention. However, it will be apparent to one skilled in the art that the present invention may be practiced without the specific details. In other instances, well-known circuits and devices are shown in block diagram form in order not to obscure the present invention unnecessarily. It will be apparent to one skilled in the art, however, that the deadlock detection and masking system of the present invention may be applied to different arbiters and different bus systems.

Figure 1:
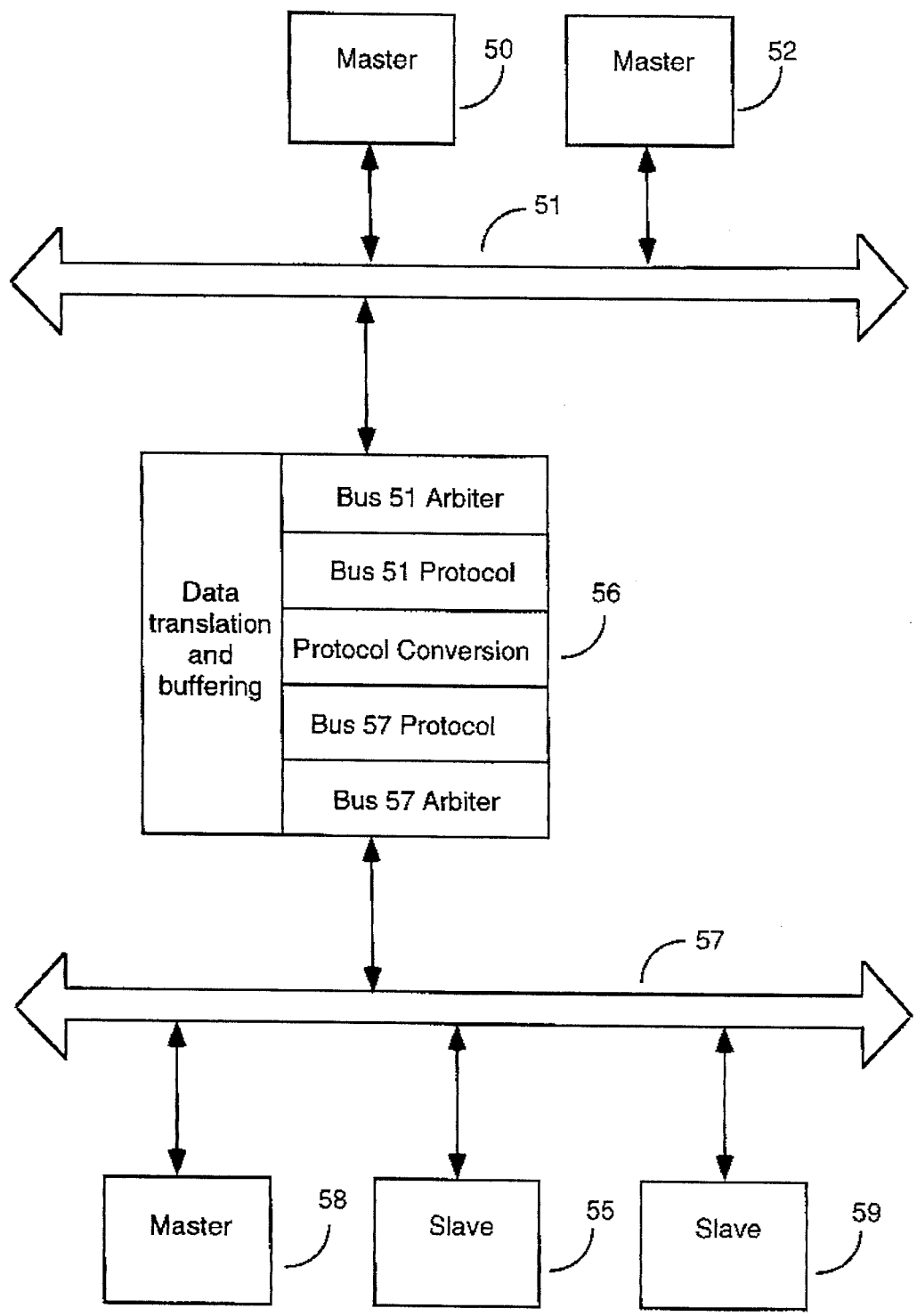
FIG. 1 is a prior art block diagram representation of a multiple bus system coupled to a bus coupler.
Figure 2:
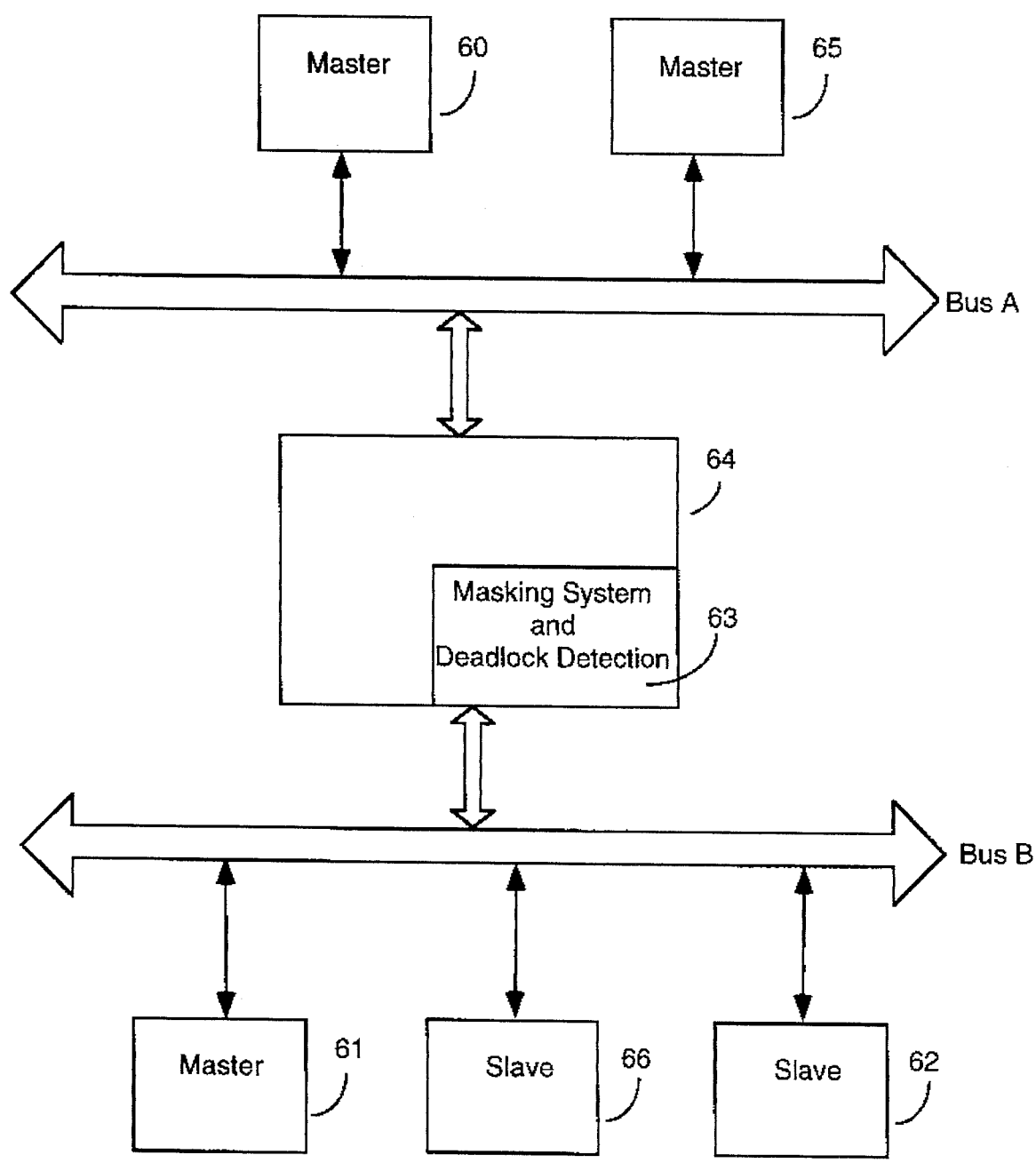
FIG. 2 is a block diagram representation of a deadlock detection and masking system coupled to a multiple bus system.

Referring to FIG. 2, a general overview of the present invention applied to a multiple bus system is shown in block diagram form. Masters 60 and 65 are coupled to a bus A, and a master 61 and slaves 62 and 66 are coupled to bus B. Both bus A and bus B are intercoupled via a bus coupler 64. Bus coupler 64 incorporates a deadlock detection and masking block 63. Bus coupler 64 further includes an arbiter coupled to each bus to determine which master may control the respective buses A and B. In the system of the present invention, deadlock detection and masking block 63 detects whenever a potential arbitration deadlock condition arises between two masters coupled to different buses seeking control of one slave connected to one bus. As illustrated in FIG. 2, a potential arbitration deadlock for control of a bus occurs when a first master (either masters 60 or 65) coupled to a first bus (bus A) attempts to access a slave(either slaves 62 or 66) on a second bus (bus B), wherein the first master has received a "relinquish and retry" signal from the slave, but where the first master is prevented from reaccessing the slave because the arbiter for the second bus continues to grant control of the second bus to a second master (master 61) connected to the second bus which is also attempting to access the same slave.

Whenever a master disconnects from a bus pursuant to a "relinquish and retry" signal issued by a slave, the disconnect may take one of two forms: "stateless" and "stateful". The present invention specifically incorporates the relinquish and retry mechanism described in above-referenced co-pending U.S. patent application, entitled "Bus-to-Bus Interface for Preventing Data Incoherence in a Multiple Processor Computer System", Ser. No. 07/766,784.

Once deadlock detection and masking block 63 detects a potential arbitration deadlock, a masking system within deadlock detection and masking block 63 prohibits the second master from gaining control of the second bus for a random period of time, thereby providing the first master an opportunity to access the bus and slave and subsequently clear the pending relinquish and retry signal. By providing a random masking period, the complementary synchronized timing of the arbitration deadlock condition between the first and second masters is avoided. Preferably, the random masking period is based on the residue count of a counter provided in the masking system.

The random masking system of the present invention accommodates multiple types of masters because the period of masking is random, and is not fixed to any particular time. The amount of time a master requires to clear the relinquish and retry "condition" from a slave depends on how quickly the master is able to reaccess the slave issuing the "relinquish and retry" signal. Therefore, a fixed period of masking would limit the scope of masters which could be accommodated by a slave, and not accommodate multiple types of master coupled to a bus. For example, a master requiring 250 nanoseconds to clear the pending relinquish and retry "condition" could not accommodate a fixed masking period of 200 nanoseconds. After 200 nanoseconds a deadlock between two masters would still exist because the master requiring 250 nanoseconds would be unable to reaccess the slave within the 200 nanoseconds allotted during the masking period.

Figure 3:
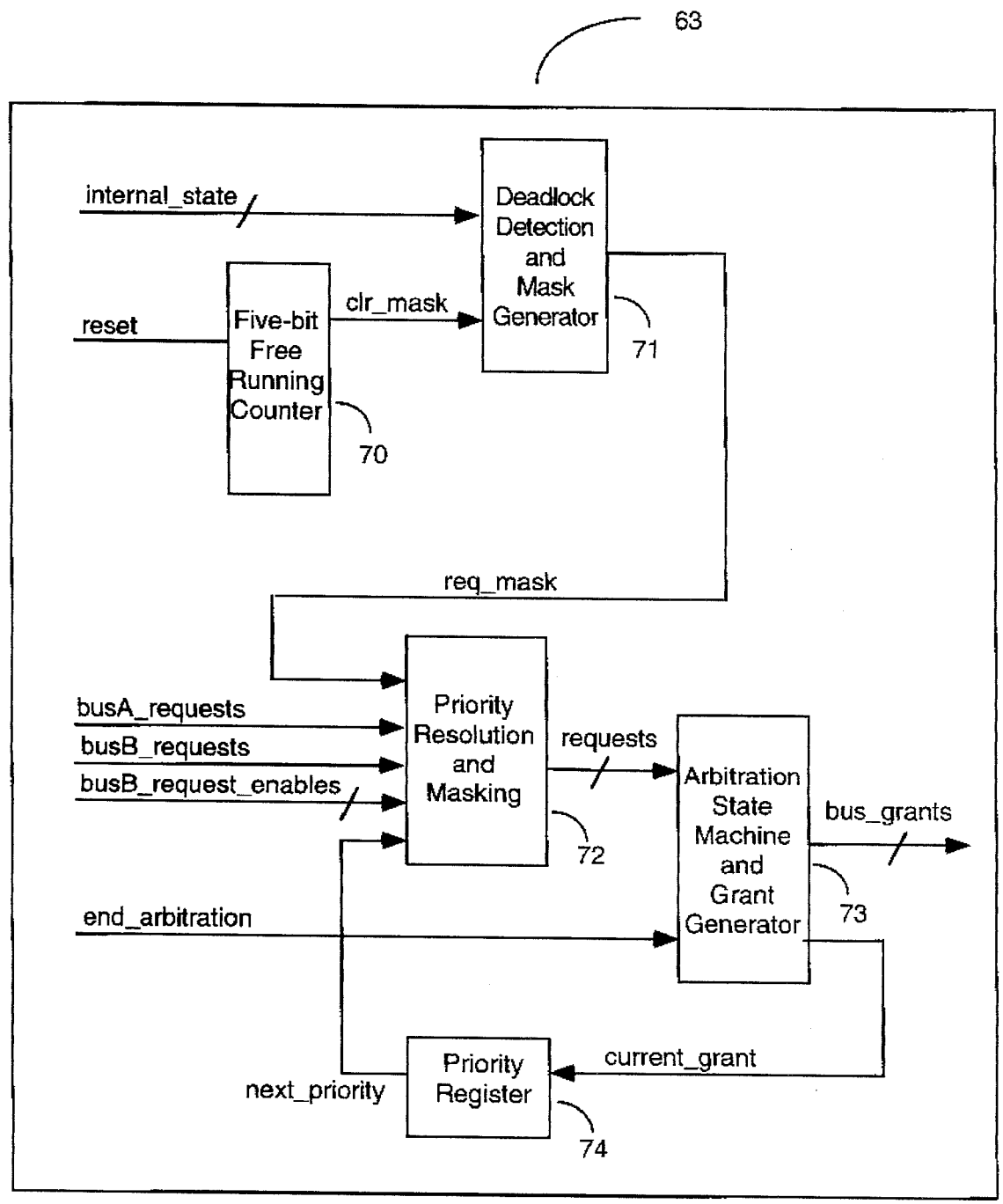
FIG. 3 is a block diagram representation of the deadlock detection and masking system shown in more detail.

Referring now to FIG. 3, the deadlock detection and masking block 63 is shown in more detail. A deadlock detection and mask generator block 71 receives a number of internal_state signals which indicate a potential deadlock situation is occurring between two masters. Upon receipt of the internal_state signals, deadlock detection and mask generator block 71 issues a "request mask" signal (req_mask) to initiate a masking process to mask out bus request signals from certain masters.

A five-bit free running counter 70 counts in single increments, one increment per clock cycle, from zero to a maximum count value. The maximum count value is arbitrary, but it is recommended that sufficient counts be provided to assure sufficient "randomization" between accessing masters. After counter 70 reaches the maximum count value, it resets to zero and begins again to count up to the maximum count value. When counter 70 resets to zero, it generates a "clear mask" signal (clr_mask) to cease the masking process. Clr_mask is directed to deadlock detection and masking generator block 71.

A priority resolution and masking block 72 receives the request mask signal from deadlock detection and mask generator block 71. Priority resolution and masking block 72 also receives bus request signals (shown as busA_requests) from a master coupled to a first bus (bus A), as well as bus request (busB_requests) signals and bus request enable signals (busB_request_enables) from masters coupled to a second bus (bus B). Priority resolution and masking block 72 receives various input signals: "req_mask", "busA_requests", "busB_requests" signals, "busB_request_enables", and "next_priority". The "busA_requests" signals are bus requests issued by masters coupled to bus A requesting for control of bus B. The "busB_requests" signals are requests by masters coupled to bus B for control of bus B. The "busB_request_enables" signals indicate whether a bus request signal for control of bus B received from a master coupled to bus B should be propagated to arbitration state machine and grant generator block 73. The "next_priority" signal indicates which master may control bus B at the next bus cycle. The asserted "req_mask" signal causes priority resolution and masking block 72 to mask all the "busB_requests" signals and generate "requests" signals that grants priority for control of bus B to the master on bus A.

Priority resolution and masking block 72 also receives a "priority" signal (next_priority) indicating which master may control the second bus at the next bus cycle. After the request mask signal is received, priority resolution and masking block 72 masks out all requests for control of the second bus from masters coupled to the second bus, and issues a request signal that grants priority for control of the second bus to a master on bus A.

Arbitration state machine and grant generator block 73 functions as an arbiter for the second bus to arbitrate pending bus request signals. An arbitration state machine and grant generator block 73 receives two types of inputs: request signals from priority resolution and masking block 72, and an end_arbitration signal indicating the end of a bus cycle. Further, arbitration state machine and grant generator block 73 issues two types of output signals: bus grant signals (bus_grants) granting control of the bus to the master having the highest priority determined by priority resolution and masking block 72, and current_grant signal identifying the master which was granted control of the bus. A priority register 74 receives the current_grant signal identifying the master granted control of the bus by arbitration state machine and grant generator block 73. Priority register 74 in turn issues a next_priority signal indicating which master may control the second bus beginning the next bus cycle.

Still referring to FIG. 3, the "internal_state" signals functionally monitor the occurrence of the relinquish and retry command issued by a slave, and indicate a potential deadlock situation between two masters. Deadlock detection and mask generator block 71 upon receipt of the asserted "internal_state" signals, issues the "req_mask" signal that starts the masking process, and continues to issue that signal until it receives the "clr_mask" signal from counter 70 which stops the masking process. Counter 70 generates the "clr_mask" signal after it reaches the maximum count value, and thereafter resets to zero.

Arbitration state machine and grant generator block 73 receives the "requests" signals from priority resolution and masking block 72, and then issues the "bus_grant" signal giving control of bus B to the master granted priority by priority resolution and masking block 72. Arbitration state machine and grant generator block 73 assures the "bus_grant" signal remains asserted until block 73 receives an "end_arbitration" signal indicating the end of a bus cycle. Arbitration state machine and grant generator block 73 also generates a "current_grant" signal identifying which master was given control of bus B by the "bus_grant" signal. The "current_grant" signal is then passed to priority register 74 which issues a "next_priority" signal identifying the master that will next have control of bus B at the next bus cycle.

As applied to the preferred embodiment shown in FIG. 2, master 60 may control bus A and bus B to access slave 62. If slave 62 is busy, or the time to complete the task by the slave exceeds a predetermined time, slave 62 issues a "relinquish and retry" signal to master 60. Bus coupler 64 monitors the occurrence of the relinquish and retry signal and indicates a possible deadlock situation by issuing an "internal_state" signals (FIG. 3). If bus coupler 64 asserts the "internal_state" signals to indicate a possible deadlock situation, deadlock detection and masking system 63 then masks the bus request for bus B asserted by master 61 for a random period of time according to and depending on counter 70, thereby giving master 60 an opportunity to reaccess slave 62 to clear the pending relinquish and retry "condition". Thus, by imposing a random time mask on complimentary synchronous access attempts by masters 60 and 61, the arbitration deadlock condition between master 60 and master 61 seeking control of bus B and slave 62 is avoided in the first instance.

Figure 4:
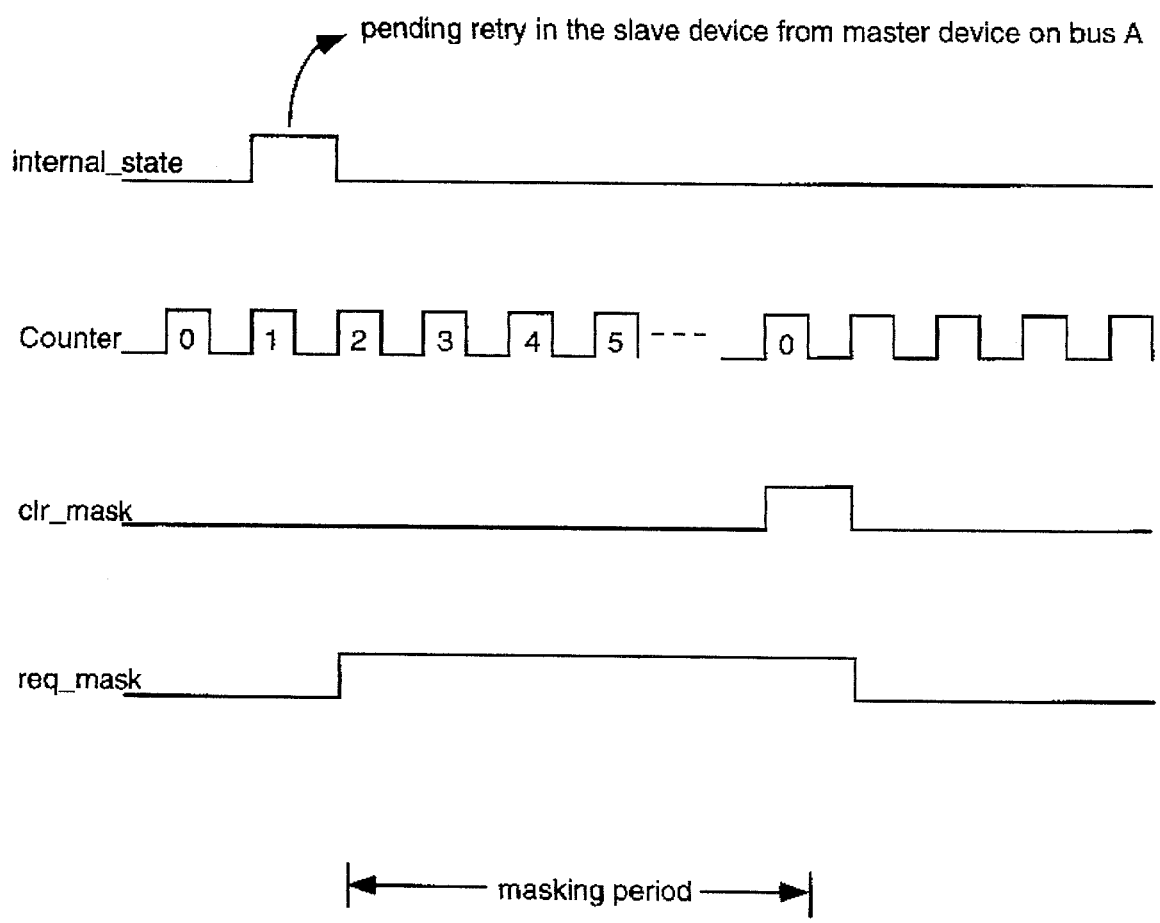
FIG. 4 is a timing diagram illustrating the random masking period of the masking system.

Referring briefly to FIG. 4, a timing diagram illustrating the relationship between the various system signals and the masking period induced by counter 70 is shown. The "internal_state" signals trigger the "req_mask" signal indicating the existence of a potential arbitration deadlock condition in deadlock detection and mask generator block 71 (FIG. 3). As mentioned previously, the "clr_mask" signal is generated by counter 70 (FIG. 3) whenever counter 70 resets to zero. The time during which the bus request signals are masked ranges from the time the "req_mask" signal is triggered by deadlock detection and mask generator block 71 receiving the "internal_state" signals until the removal of the "req_mask" caused by deadlock detection and mask generator block 71 receiving the "clr_mask" signal.

The foregoing has described a bus arbitration architecture incorporating facilities for deadlock detection and masking. It is contemplated that changes and modifications may be made by one of ordinary skill in the art, to the materials and arrangements of elements of the present invention without departing from the spirit and scope of the invention.

I claim:

1. In a data processing system including a bus coupler coupled between a first bus and a second bus, said first bus coupled to at least one first bus master, said second bus coupled to at least one second bus master and to at least one slave, a deadlock detection and masking system, said data processing system comprising:

counter means for generating a clear masking signal after a random period of time;

detection means coupled to said bus coupler and to said counter means for sensing an arbitration deadlock between said first bus master and said second bus master for control of said second bus, wherein said first bus master accesses said slave coupled to said second bus, said slave accepting a delegated task and issuing a relinquish and retry signal to said first bus master, said detection means sensing said arbitration deadlock if said second bus master thereafter transmits said bus request signals to said slave issuing the relinquish and retry signal to said first bus master; and master masking means coupled to said detection means and to said second bus for masking bus request signals from said second bus master, said master masking means receiving bus request signals from said first and second bus masters attempting to control said second bus;

said master masking means thereafter masking said bus request signals from said second bus master until said clear masking signal is generated by said counter means after said random period of time, wherein said first bus master has control of said second bus until said clear masking signal is generated after said random period of time.

2. In a data processing system including a bus coupler coupled between a first bus and a second bus, said first bus coupled to at least one first bus master, said second bus coupled to at least one second bus master and to at least one slave, a deadlock detection and masking system, said data processing system comprising:

counter means for generating a clear masking signal after a random period of time;

detection means coupled to said bus coupler and to said counter means for sensing an arbitration deadlock between said first bus master and said second bus master for control of said second bus, said detection means sensing said arbitration deadlock after said first bus master has released control of said second bus, after which said second bus master transmits bus request signals to said slave; and master masking means coupled to said detection means and to said second bus for masking bus request signals from said second bus master, said master masking means receiving bus request signals from said first and second bus masters attempting to control said second bus;

said master masking means thereafter masking said bus request signals from said second bus master until said clear masking signal is generated by said counter means after said random period of time, wherein said first bus-master has control of said second bus until said clear masking signal is generated after said random period of time.

3. The deadlock detection and masking system according to claim 2, wherein said detection means generates a request mask signal when said arbitration deadlock is detected.

4. The deadlock detection and masking system set forth in claim 3, wherein said counter means, having a maximum value to which it can count, increments from zero to said maximum value and resets to zero, said counter means generating said clear mask signal after resetting to zero.

5. The deadlock detection and masking system as set forth in claim 1 further comprising priority resolution and masking means for prioritizing said bus request signals, said priority resolution and masking means coupled to receive said bus request signals and a request mask signal from said detection means and producing a plurality of output masked requests.

6. The deadlock detection and masking system as set forth in claim 1, wherein said bus coupler includes an arbiter.

7. In a data processing system including a bus coupler coupled between a first bus and a second bus, said first bus coupled to at least one first bus master, said second bus coupled to at least one second bus master and to at least one slave, a deadlock detection and masking system, said data processing system comprising:

counter means for generating a clear masking signal after a random period of time, said counter means, having a maximum value to which it can count, increments from zero to said maximum value and resets to zero, said counter means generating said clear mask signal after resetting to zero;

detection means coupled to said bus coupler and to said counter means for sensing an arbitration deadlock between said first bus master and said second bus master for control of said second bus, wherein said first bus master accesses said slave coupled to said second bus, said slave accepting a delegated task and issuing a relinquish and retry signal to said first bus master, said detection means sensing said arbitration deadlock if said second bus master thereafter transmits said bus request signals to said slave issuing the relinquish and retry signal to said first bus master, said detection means generates a request mask signal when said arbitration deadlock is detected, said detection means generating said request mask signal until receiving said clear masking signal from said counter means; and masking means coupled to said detection means and to said second bus for masking bus request signals from said second bus master, said masking means receiving bus request signals from said first and second bus masters attempting to control said second bus, said masking means thereafter masking said bus request signals from said second bus master until said clear mask signal is generated.

8. The deadlock detection and masking system set forth in claim 7, wherein said counter means comprises a free running five-bit counter.

9. In a data processing system including a bus coupler coupled between a first bus and a second bus, said first bus coupled to at least one first bus master, said second bus coupled to at least one second bus master and at least one slave, a deadlock detection and masking system comprising:

deadlock detection and mask generator means for detecting an arbitration deadlock between said first and second bus masters, said deadlock detection and mask generator means coupled to receive a plurality of internal state signals from said bus coupler and a clear mask signal, said deadlock detection and mask generator means generating an output request mask signal;

counter means for generating said clear masking signal after a random period of time when said counter means resets, said counter means coupled to said deadlock detection and mask generator means;

priority resolution and masking means for prioritizing a plurality of bus request signals, said priority resolution and masking means coupled to receive said bus request signals and said request mask signal and producing a plurality of output masked requests;

arbitration state machine and grant generator means coupled to said priority resolution and masking means for producing a plurality of bus grant signals, said arbitration state machine and grant generator means receiving said masked requests;

a priority register coupled to said arbitration state machine and grant generator means and said priority resolution and masking means, said priority register receiving one of said bus grant signals and producing an output next priority signal.

10. The deadlock detection and masking system according to claim 9, wherein said first bus master accesses said slave coupled to said second bus, said slave accepting a delegated task and issuing a relinquish and retry signal to said first bus master;

said deadlock detection and mask generator means sensing said arbitration deadlock if said second bus master thereafter transmits said bus request signals to said slave issuing the relinquish and retry signal to said first bus master.

11. The deadlock detection and masking system set forth in claim 9, wherein said counter means, having a maximum value to which it can count, increments from zero to said maximum value and resets to zero, said counter means generating said clear mask signal upon resetting to zero.

12. The deadlock detection and masking system set forth in claim 11, wherein said counter means comprises a free running five-bit counter.

13. The deadlock detection and masking system set forth in claim 12, wherein said arbitration state machine and grant generator means is further coupled to receive an end arbitration signal.

14. In a data processing system including a bus coupler coupled between a first bus and a second bus, said first bus further coupled to at least one first bus master, said second bus further coupled to at least one second bus master and at least one slave, a method for deadlock detection and masking comprising the steps of:

providing counter means for generating a clear masking signal after a random period of time, said counter means incrementing from zero to a maximum value and resetting to zero after incrementing to said maximum value;

receiving a plurality of bus request signals from said first and second bus masters attempting to control said second bus;

providing detection means coupled to said bus coupler and to said buses for sensing an arbitration deadlock between said first bus master and said second bus master for control of said second bus, said detection means sensing said arbitration deadlock after said first bus master has released control of said second bus, after which said second bus master transmits bus request signals to said slave;

providing a request mask signal upon sensing said arbitration deadlock, and masking said bus request signals from said second bus master using master masking means until said clear masking signal is generated by said counter means after said random period of time, wherein said first bus master has control of said second bus until said clear masking signal is generated after said random period of time.

15. In a data processing system including a bus coupler coupled between a first bus and a second bus, said first bus further coupled to at least one first bus master, said second bus further coupled to at least one second bus master and at least one slave, a method for deadlock detection and masking comprising the steps of:

providing counter means for generating a clear masking signal after a random period of time, said counter means incrementing from zero to a maximum value and resetting to zero after incrementing to said maximum value;

receiving a plurality of bus request signals from said first and second bus masters attempting to control said second bus;

providing detection means coupled to said bus coupler and to said buses for sensing an arbitration deadlock between said first bus master and said second bus master for control of said second bus, wherein said first bus master accesses said slave coupled to said second bus and delegates a task to said slave, said slave thereafter issuing a relinquish and retry signal to said first bus master, sensing said arbitration deadlock with said detection means if said second bus master thereafter transmits bus request signals to said slave issuing the relinquish and retry signal to said first bus master;

providing a request mask signal upon sensing said arbitration deadlock, and masking said bus request signals from said second bus master using master masking means until said clear masking signal is generated by said counter means after said random period of time, wherein said first bus master has control of said second bus until said clear masking signal is generated after said random period of time.

16. The method set forth in claim 15 further comprising masking said bus request signals for a random period of time after receipt of said request mask signal, said masking continuing until said counter means reaches said maximum value, resets to zero, and generates the clear masking signal.

17. The method set forth in claim 16, wherein providing said counter means further comprises providing a clear masking signal when said counter means resets.

18. In a data processing system including a bus coupler coupled between a first bus and a second bus, said first bus further coupled to at least one first bus master, said second bus further coupled to at least one second bus master and at least one slave, a method for deadlock detection and masking comprising the steps of:

providing counter means for incrementing from zero to a maximum value and resetting to zero after incrementing to said maximum value, providing a clear masking signal when said counter means resets;

receiving a plurality of bus request signals from said first and second bus masters attempting to control said second bus;

providing detection means coupled to said bus coupler and to said buses for sensing an arbitration deadlock between said first bus master and said second bus master for control of said second bus, wherein said first bus master accesses said slave coupled to said second bus and delegating a task to said slave, said slave thereafter issuing a relinquish and retry signal to said first bus master, and sensing said arbitration deadlock if said second bus master thereafter transmits bus request signals to said slave issuing the relinquish and retry signal to said first bus master;

providing a request mask signal upon sensing said arbitration deadlock, generating said request mask signal until receiving said clear masking signal from said counter means;

masking said bus request signals from said second bus master for a random period of time after receipt of said request mask signal, said masking continuing until the counter means reaches the maximum value, resets to zero and generates the clean masking signal.

19. The method set forth in claim 18, further comprising the step of generating said request mask signal upon detection of said arbitration deadlock.

* * * * *